US010565279B2

(12) United States Patent
Reddy et al.

(10) Patent No.: US 10,565,279 B2
(45) Date of Patent: Feb. 18, 2020

(54) CONTEXTUAL SEARCH FOR LOCATION SERVICES

(71) Applicant: Uber Technologies, Inc., San Francisco, CA (US)

(72) Inventors: Srihari Reddy, Sunnyvale, CA (US); Paul Mahon, Alameda, CA (US); Brent Hamby, Oakland, CA (US); Brandon Iles, Milpitas, CA (US); Aditya Sarawgi, San Francisco, CA (US); Will Salisbury, San Francisco, CA (US); Zach Song, San Ramon, CA (US); Juthika Dabholkar, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 311 days.

(21) Appl. No.: 15/286,553

(22) Filed: Oct. 5, 2016

(65) Prior Publication Data
US 2018/0095977 A1    Apr. 5, 2018

(51) Int. Cl.
*G06F 16/9537* (2019.01)
*G06F 16/29* (2019.01)
*G06F 16/9535* (2019.01)
*G06F 16/2457* (2019.01)
*G06F 16/22* (2019.01)

(52) U.S. Cl.
CPC ...... *G06F 16/9537* (2019.01); *G06F 16/2246* (2019.01); *G06F 16/24575* (2019.01); *G06F 16/24578* (2019.01); *G06F 16/29* (2019.01); *G06F 16/9535* (2019.01)

(58) Field of Classification Search
CPC .......... G06F 16/2246; G06F 16/24575; G06F 16/24578; G06F 16/29
See application file for complete search history.

(56) References Cited

U.S. PATENT DOCUMENTS

| 2007/0255831 | A1* | 11/2007 | Hayashi | G06F 17/30867 709/226 |
| 2009/0049032 | A1* | 2/2009 | Maghoul | G06F 17/3087 |
| 2012/0041675 | A1 | 2/2012 | Juliver et al. | |

(Continued)

OTHER PUBLICATIONS

PCT International Search Report and Written Opinion, PCT Application No. PCT/IB2017/056163, dated Jan. 31, 2018, 16 pages.

*Primary Examiner* — Marc S Somers
(74) *Attorney, Agent, or Firm* — Fenwick & West LLP

(57) ABSTRACT

A travel coordination system identifies geographic locations responsive to a location search request. The geographic locations are organized into a plurality of hierarchical geohash levels, each geohash level mapping the geographic location into a geohash of a different area. The locations search request designates a search context for the search, such as whether the user is searching for an origin of a trip or a destination. The context of the search can be used to determine a geohash level for selecting candidate search results. The candidate search results may be scored based on the context using prior user selections and trips scheduled with the trip coordination system. A geohash and context associated with the user's request may be used to modify a scoring function of the candidate search results based on prior trips.

15 Claims, 7 Drawing Sheets

(56) References Cited

U.S. PATENT DOCUMENTS

| | | | |
|---|---|---|---|
| 2013/0097163 A1* | 4/2013 | Oikarinen | G06F 17/30241 |
| | | | 707/736 |
| 2013/0132140 A1 | 5/2013 | Amin et al. | |
| 2014/0214791 A1* | 7/2014 | Singh | G06F 17/3087 |
| | | | 707/710 |
| 2014/0214814 A1* | 7/2014 | Sankar | G06F 17/30867 |
| | | | 707/723 |
| 2014/0280318 A1 | 9/2014 | Simms et al. | |
| 2014/0304258 A1* | 10/2014 | Vyas | G06F 17/3087 |
| | | | 707/724 |
| 2015/0019531 A1 | 1/2015 | Bursey | |
| 2015/0161564 A1* | 6/2015 | Sweeney | G06Q 10/063114 |
| | | | 705/338 |
| 2015/0339923 A1 | 11/2015 | Konig et al. | |

\* cited by examiner

CONTEXTUAL SEARCH FOR LOCATION SERVICES

BACKGROUND

This disclosure relates generally to identifying locations responsive to a search query.

Travel coordination systems provide a means of travel by connecting people who need rides (i.e., "riders") with drivers (i.e., "providers"). A rider (i.e., a user) can submit a request for a ride to the travel coordination system, and the travel coordination system selects a provider to service the request by transporting the rider to their intended destination.

To assist in providing the trip, the travel coordination system may also select locations for a user's trip responsive to a search query from the user. The user may use the search query to select an origin (i.e., a pickup location) or to select a destination for the trip. The search query may specify a set of terms that can be used to by the travel coordination system to identify relevant locations. However, the selected locations may not account for likely user requests at the user's area.

SUMMARY

A travel coordination system searches for locations responsive to a search query. To search for locations, the travel coordination system identifies a user's location and retrieves and scores locations based on the user's location and a context of the search. The search context represents various parameters for the user's search request, such as the time of day and whether the search is for an origin or a destination. These locations may represent points of interest, roads, intersections, point addresses, and other types of geographic locations for travel, services, goods, events, etc., as well as other users or non-fixed entities.

The travel coordination system identifies a set of locations as search results based on the search context. As one example, the locations are indexed by one or more sets of geohashes. Each set of geohashes is termed a geohash level. Each geohash level may specify geohashes of different sizes for indexing the locations. For example, at the smallest geohash level, a geohash may specify an area of 0.5 square kilometer ($km^2$), while at a larger geohash level another geohash may specify an area of 25 $km^2$. In one example for identifying search locations using the context, the context is used to determine a geohash level for the search. As one example, in a search for an origin location, a level having a smaller area is selected compared to a search for a destination location. At the selected level, the user's location is mapped to a geohash to identify the user geohash. Search results may be selected from among locations associated with the user geohash. In one embodiment, the geohash is associated with a "search shingle" representing locations within a threshold distance of the geohash in addition to locations in the geohash. The search query is then executed on the locations associated with the user geohash (or the related search shingle) to identify locations relevant to the search query.

In some embodiments, more than one geohash level is selected for consideration of the search results. The search results for the higher geohash (e.g., geohash levels with geohashes having a greater area) may be reduced in score relative to search results for a lower level, but may permit a user to quickly search greater distances from the user geohash. In additional embodiments, the geohash level selected for the search is determined based on a frequency of user search results belonging to the search results within that geohash level. For example, the geohash levels may be selected to include 80%, 95%, and 100% of the results selected for a specific context.

The identified locations may also be ranked based on the search context. Using prior trip information, historical results for searches may be used to affect ranking of the search based on the search context. Accordingly, a function for scoring and ranking search results may be selected or modified based on the search context. In one example, the travel coordination system models the likelihood that a user's search from one geocode results in a selection of a search result in another geocode. This likelihood may be determined by determining a function associated with the user's geocode describing the likelihood of a user traveling a given distance. Alternatively, the likelihood of selecting a specific search result geohash based on the user's search geohash may also be used. For search results, the geohash of a result (or the distance of the result from the user) is applied to this function to score and rank the search result. Additional search contexts may also be used to rank search results, such as the time of day. The function for scoring a destination geocode from an origin geocode may also vary according to a time of day. In addition, the time of day may be used in conjunction with a location's operating hours to score the likelihood that the location is a result the user is likely to select.

By indexing locations according to varying geohash levels, the search for location results may more quickly search for search results by querying the appropriate search shingle within a geohash level, rather than searching an entire location database for matches. In addition, by selecting geohash levels and scoring the results according to actual user frequency of trip selection in the given context, more relevant search results may be determined for the user's search and may permit identifying desired search results more reliably and with better accuracy, among other aspects. The search may be performed or updated each time a user enters a character in a search query, and due to the improved accuracy and prediction, may permit the user to identify a desired search result with fewer characters and keystrokes.

DETAILED DESCRIPTION

Figure 1:
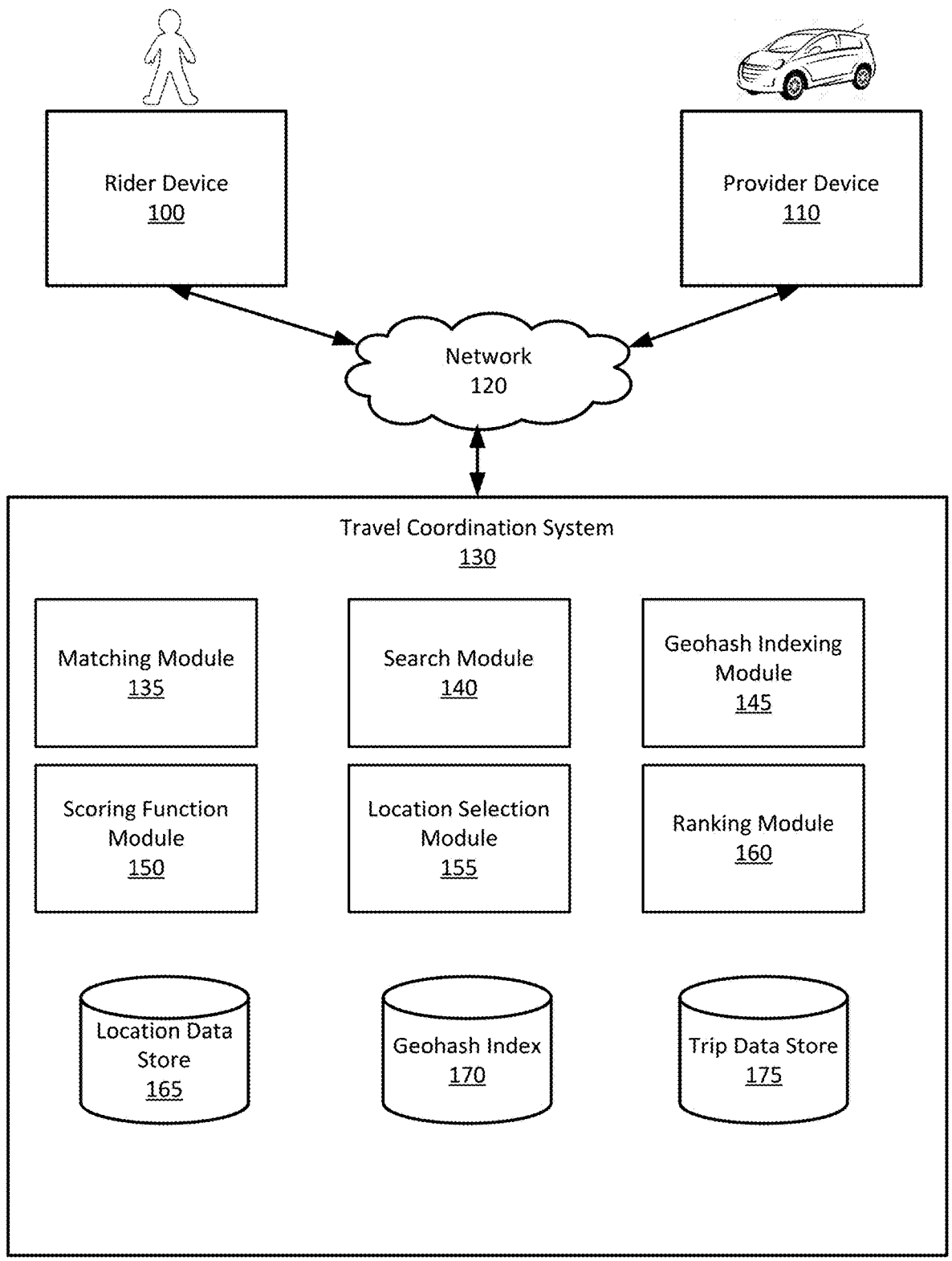
FIG. 1 illustrates a system environment and architecture for a travel coordination system, in accordance with some embodiments.

FIG. 1 illustrates a system environment and architecture for a travel coordination system 130, in accordance with some embodiments. The illustrated system environment includes a rider device 100, a provider device 110, a network 120, and a travel coordination system 130. In alternative configurations, different and/or additional components may be included in the system environment. The travel coordination system 130 provides travel coordination services between a number of riders each operating a rider device 100 and a number of providers each operating a provider device 110 in a given region. It will be appreciated that a rider as used herein can refer to a user of rider device 100 and need not be a passenger of a vehicle. Rider device 100 as used herein can refer to any suitable device configured to request services, e.g. programmatically, from the system.

This disclosure discusses location searching for the travel coordination system 130 to provide relevant locations to a rider device 100 when identifying a point associated with a trip, such as where to begin (an origin) or end (a destination) a trip. These location searching features may be applied to other location search services and are not restricted to travel coordination. As discussed further below, the travel coordination system 130 provides searching for a rider to identify locations by organizing locations into geohashes and using the geohashes to retrieve search locations as well as determine scoring and ranking for search results. Each geohash represents a particular geographical area and the geohashes may be organized into a set of geohash levels as discussed below. In particular, a geohash can be an encoding of coordinates that define a (e.g., bounded) spatial location or geographic region. Furthermore, example embodiments can include an index of geohashes to POIs in respective geohashes.

In general, the discussion herein relates to a rider requesting a location search from the travel coordination system 130 using a rider device 100, for example to identify an origin or destination of a trip. For convenience, the person or entity providing the search request, such as a rider, is referred to herein as a "user." In other configurations, a provider may be the "user" providing search requests via the provider device 110 (e.g., for a rider that has already begun a trip with the provider), and in other configurations, search requests may be provided by users searching for purposes other than travel coordination.

By using the rider device 100, the rider can interact with the travel coordination system 130 to request a transportation service from an origin (e.g., a pickup location) to a destination (e.g., a dropoff location). While examples described herein relate to a transportation service, the travel coordination system 130 can enable other services to be requested by requesters, such as a delivery service, food service, entertainment service, etc., in which a provider is to travel to a particular location. A rider can make a trip request to the travel coordination system 130 to request a trip by operating the rider device 100. As described herein, a rider device 100 and/or a provider device 110 can be a personal or mobile computing device, such as a smartphone, a tablet, a wearable computing device, a vehicle, or a computer. In some embodiments, the personal computing device executes a client application that uses an application programming interface (API) to communicate with the travel coordination system 130 through the network(s) 120. According to an example, a trip request can contain rider identification information, the number of passengers for the trip, a requested type of the provider (e.g., a vehicle type or service option identifier), the current location and/or the pickup location (e.g., a user-specific location, or a current location of the rider determined using a geo-aware resource of the rider device 100), and/or the destination for the trip.

To identify locations for the trip request, the rider device 100 may provide location search requests to the travel coordination system 130. To start a location search request, the user may enter a search query on the rider device 100, which provides the search query to the travel coordination system 130. The user may select a field or otherwise designate the purpose for the search, such as whether the user is searching for a location to begin or end a trip request or the type of service that is being requested (e.g., rider pickup and dropoff or product delivery). The user may also enter other information, such as when to begin the trip, and other information. The purpose of the search may also be determined by the rider device 100 based on a field in which the user enters the request, such as in a "pickup" field or a "destination" field. The search query is entered as a string of characters. The search query is sent in a search request to the travel coordination system 130. The search request also includes a search context specifying additional information about the search beyond the search query. The search context may specify, for example, a location of the rider device 100, the purpose of the search (e.g., whether the search query is entered for an origin or a destination), and a time of day for the search, or a time of day at which the trip should begin (e.g., if at a later time). Additional search contexts may also be included, such as whether the user is requesting to pool with other users, whether the search is for a trip in which the user will be a passenger, or the search is for another purpose (i.e., another person, or as a delivery request), the searching user's experience with the ride provider system (e.g., a first-time rider or an experienced rider). To determine the location of the rider device 100, the user may enter a location, or the rider device 100 may automatically determine the location using location sensors, such as a global positioning satellite (GPS) receiver. As used herein, automatically performing an action can correspond to performing the action without user intervention. The location of the rider device 100 is also included in the search context.

In some embodiments, a search request is sent to the travel coordination system 130 each time the search query changes. For example, a user may begin entering a string of characters "main street," and as the user enters each character in the search field, a new or updated search request may be provided to the travel coordination system 130, and results may be received and displayed on the rider device 100 as the user continues to enter characters, such that if the travel coordination system 130 provides the desired result as the user enters characters from an intended search query, the user can avoid the need to type the entire string.

The rider device 100 receives location search results from the travel coordination system 130 and provides the locations search results to the user for selection of a desired location. The location search results may be provided from the travel coordination system 130 as a ranked or sorted list to indicate the locations most likely to be selected by the user. When a user selects locations for the origin and destination of the trip, the user may include these locations in the trip request for the travel coordination system 130.

The provider can interact, via the provider device 110, with the travel coordination system 130 to connect with riders to whom the provider can provide the requested service (e.g., transportation). In some embodiments, the provider is a person driving a car, bicycle, bus, truck, boat, or other motorized or non-motorized vehicle capable of transporting passengers or items or capable of providing a service. In some embodiments, the provider is an autonomous vehicle that receives routing instructions from the travel coordination system 130. For convenience, this disclosure generally uses a car with a driver as an example provider. However, the embodiments described herein may be adapted for these alternative providers.

A provider device 110 receives, from the travel coordination system 130, assignment requests to be assigned to transport a rider who submitted a trip request to the travel coordination system 130. For example, the travel coordination system 130 can receive a trip request from a rider device 100, select a provider from a pool of available (or open) providers to provide the trip, and transmit an invitation message to the selected provider's device 110. In some embodiments, when a provider device 110 receives an assignment request, the provider has the option of accepting or rejecting the assignment request. By accepting the assignment request, the provider is assigned to the rider, and is provided the rider's pickup location and trip destination. In one example, the rider's pickup location and/or destination location is provided to the provider device 110 as part of the invitation or assignment request.

In some embodiments, the provider device 110 interacts with the travel coordination system 130 through a designated client application configured to interact with the travel coordination system 130. The client application of the provider device 110 can present information, received from the travel coordination system 130, on a user interface, such as a map of the geographic region, the current location of the provider device 110, an assignment request, the pickup location for a rider, a route from a pickup location to a destination, current traffic conditions, and/or the estimated duration of the trip. According to some examples, each of the rider device 100 and the provider device 110 can include a geo-aware resource, such as a global positioning system (GPS) receiver, that can determine the current location of the respective device (e.g., a GPS point). Each client application running on the rider device 100 and the provider device 110 can determine the current location and provide the current location to the travel coordination system 130.

The rider device 100 and provider device 110 communicate with the travel coordination system 130 via the network 120, which may comprise any combination of local area and wide area networks employing wired or wireless communication links. For example, the network 120 includes communication links using technologies such as Ethernet, 802.11, worldwide interoperability for microwave access (WiMAX), 3G, 4G, code division multiple access (CDMA), digital subscriber line (DSL), etc. in example embodiments. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

The travel coordination system 130 includes various modules and data stores for providing trip matching services and location search services. In the example shown in FIG. 1, the travel coordination system 130 includes a matching module 135, a search module 140, a geohash indexing module 145, a scoring function 150, a location selection module 155, a ranking module 160, and various data stores, such as a location data store 165, a geohash index 160, and a trip data store 175. These components illustrate one example of providing location search services in the context of a travel coordination system. In other examples, location search may be provided for other systems or uses, and location search requests may be handled by a separate system from the system that uses the search results (e.g., separately from the travel coordination system 130 and matching module 135). In alternative configurations, different and/or additional components may be included in the system architecture. It will be appreciated that a number of components such as web servers, network interfaces, security functions, load balancers, failover servers, management and network operations consoles, and the like are not shown so as to not obscure the details of the system architecture. Additional data stores and services may be further included, e.g., for travel coordination, that are also not shown.

The matching module 135 provides trip matching for riders and providers and selects a provider to service the trip request of a rider. The matching module 135 receives a trip request from a rider through the rider device 100 and determines a set of candidate providers that are online, open (i.e., are available to transport a rider), and near the requested pickup location for the rider. The matching module 135 selects a provider from the set of candidate providers to which it transmits an assignment request. The provider can be selected based on the provider's location, the rider's pickup location, the type of the provider, the amount of time the provider has been waiting for an assignment request and/or the destination of the trip, among other factors. In some embodiments, the matching module 135 selects the provider who is closest to the pickup location or would take the least amount of time to travel to the pickup location. The matching module 135 sends an assignment request to the selected provider. In some embodiments, the provider device 110 always accepts the assignment request and the provider is assigned to the rider. In some embodiments, the matching module 135 awaits a response from the provider device 110 indicating whether the provider accepts the assignment request. If the provider accepts the assignment request, then the matching module 135 assigns the provider to the rider. If the provider rejects the assignment request, then the matching module 135 selects a new provider and sends an assignment request to the provider device (not shown) for that provider. In some embodiments, rather than requesting confirmation from the provider device 110, the travel coordination system 130 assigns the selected provider to the rider without express confirmation from the provider device 110.

When a trip is performed, the trip may be recorded by the travel coordination system 130 in a trip data store 175. The trip data store 175 maintains data for trips that may be pending or completed. Additional modules may also be included in travel coordination system 130 to monitor pending trips and update the trip data store 175 during the trip and when the trip completes. In addition, the trip data store 175 may store an origin and destination for the trip, along with other information related to a user's search for a location. The origin and location for a trip stored in the trip data store 175 may be used to indicate a context in which the user requested a location, such as the location of the user device when the trip was requested (e.g., the location of the device when searching for locations of the trip), the time of day of the trip and the trip request, and so forth. While this data may be stored in the trip data store 175 to identify historical location searches and the locations selected by users for the historical location searches, in other examples a dedicated data store retains this historical information. The historical information may include, for example, the search request made by a user, a search context for the search request, the search query, the search results provided to the user and the user's selected location from the search results. In addition, the historical information can also include any identified geohashes for the user device or the location selected by the user, as further discussed below. In addition, the historical information can also include data computed by aggregating user data described above.

The location data store 165 maintains information for various locations that may be searched for a user. These locations may represent various different geographical locations, such as roads, addresses, points of interest, buildings, parks, roads, businesses, and so forth. Each of these locations may include different fields describing the location, depending on the location type. For example, a road may be described by a geographical region and a range of addresses along the geographical region. A point of interest may be described by a name of the point of interest, an address for the point of interest, a narrative (e.g., textual description) of the point of interest, and so forth. The locations of the location data store 165 may be retrieved by the travel coordination system 130 from various location data providers, or may be determined and updated by the travel coordination system 130 by analyzing data of other services or systems. The locations in the location data store 165 may be provided as search results for the user search query by the search module 140 based on the geographic placement of the locations, a geohash in which the location is located, and any matching between the search query and the various fields describing the locations.

A geohash index 170 maintains an index of locations organized into one or more geohash sets, or "geohash levels." The geohash indexing module 145 generates geohashes, stores geohashes to (and otherwise maintains) the geohash index 170. A geohash defines a specific geographic region, such as 1 km$^2$, and may be uniquely identifiable within a geohash level in example embodiments. For example, a specific geohash may be identified by the value x782ab7 and define a geographical area or "fence" around specific latitude and longitude coordinates such as an area bounded on the north and west by coordinates (37° 40'34.9"N 119° 23'12.1"W) and the south and east by coordinates (37° 40'26.4"N 119° 22'59.1"W). This example geohash is a rectangle, but in practice the geohash can represent any suitable geometry, such as hexagons or other shapes.

In general, within a geohash level, each geohash has a similar (in some cases identical) size. By way of shorthand, the "size" or "area" of a geohash means the size or area of the geographic location defined by the geohash. Different geohash levels may define geohashes with different sizes. At each level, the geohash may have a specific size defining an area, such as a specified length, width, or diameter. Thus, at the lowest level, each geohash may define 0.5 km$^2$ of geographic area in a region, while at a higher level each geohash may define 25 km$^2$ and at the largest level each geohash may define 200 km$^2$ of geographic area. Within each geohash level, each geohash specifies non-overlapping geographic areas, though in some embodiments the geohashes within a level may overlap.

Figure 2:
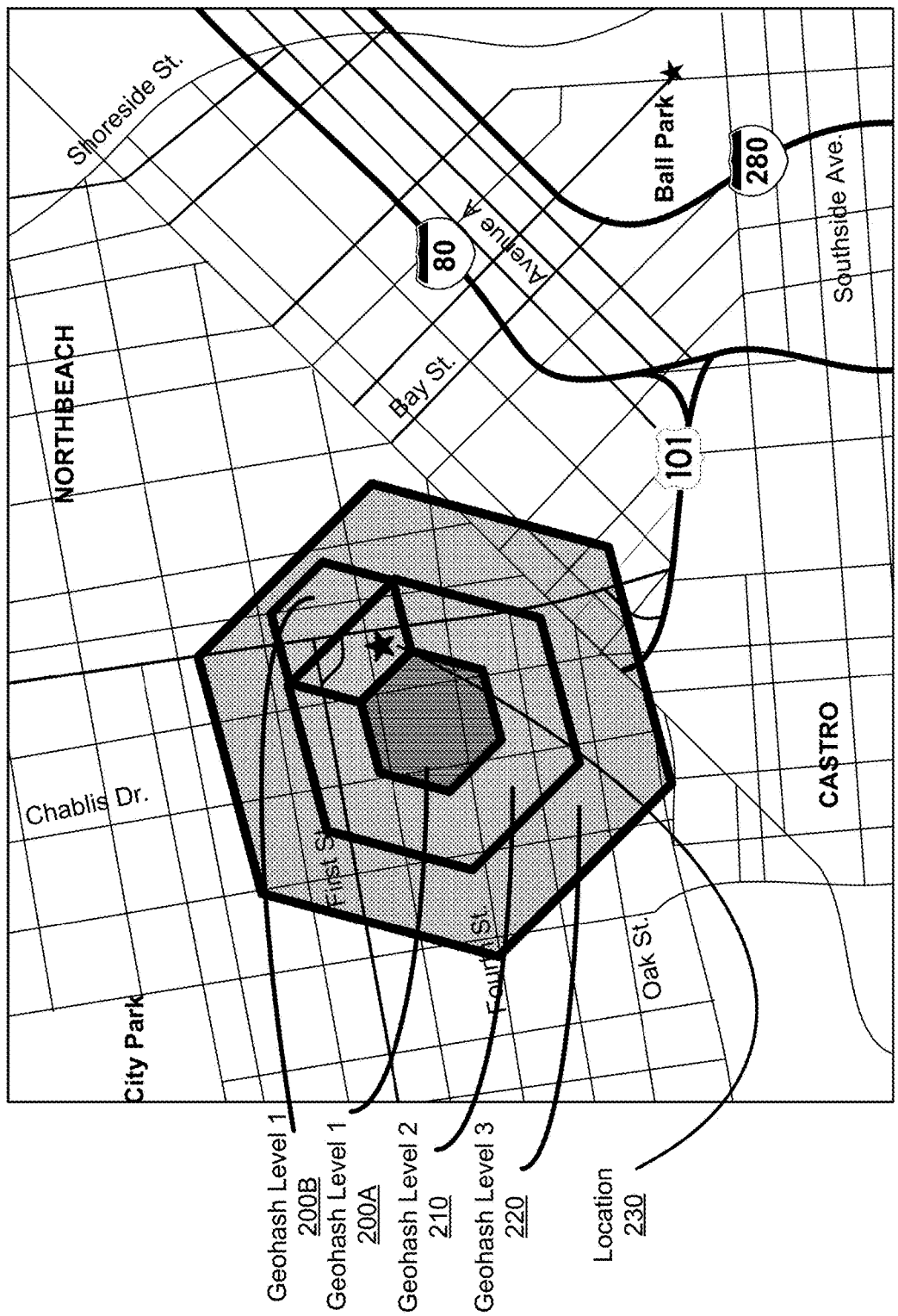
FIG. 2 illustrates example geohashes for different geohash levels in a region.

FIG. 2 illustrates example areas of geohashes for different geohash levels in a region. FIG. 2 shows two geohashes 200A, 200B of geohash level 1, and one geohash 210 of geohash level 2 and one geohash 220 of geohash level 3. This example also illustrates that in some embodiments the geohash levels may be arranged hierarchically according to the geographical area of the associated geohashes—geohash level 1 in this example has a smaller geographical size than geohash level 2, which is likewise smaller than geohash level 3. As shown in this example, two geohashes 200A, 200B may abut (and not overlap) to describe different geographical areas, though these geohashes may not both be within the same higher level, such as the geohash 210 of geohash level 2.

Locations are associated with the geohashes that encompass the area of the location. In the example of FIG. 2, the location 230 is within geohash 200B, geohash 210, and geohash 220. As shown in this example, the location 230 may be located within only one geohash for a specific geohash level (e.g., when the geohashes do not overlap within a geohash level). The location 230 may be associated with multiple levels, and for example may belong to a geohash of each of geohash levels 1, 2, and 3, (and possibly more). In this way, the geohash levels may be used to index locations by the comparative size of the different geohash levels, and the selection of a geohash level may quickly approximate a search distance. For each location, the geohash indexing module 145 may identify the geohash at each level that contains the location and associate the location with the geohash.

In addition, the geohash indexing module 145 may generate a "search shingle" for each geohash. The search shingle represents locations that may be returned as candidate search results for the associated geohash (at that level). The search shingle includes the locations of that geohash (e.g., points of interest located in the geohash boundary), and may include some locations of other nearby adjacent geohashes (e.g., "nearby" points of interest that are not within the geohash boundary). For example, a search shingle may include locations within a threshold distance of the boundary of the geohash. The threshold distance may be determined as a percentage of the size of the geohash, for example, 50% of the geohash diameter. In this way, the search shingle at a given level may be used as a proxy for a search of a given distance centered on the geographical area of the geohash. By indexing locations with a search shingle, locations can quickly be searched by the search shingle without requiring a determination of a location's distance from the geohash when a search is conducted, and can provide faster search results.

Depending on the configuration of the geohash index 170, the geohash index may store several (e.g., 3, 10, 15, 25, or more) geohash levels of different area sizes and search shingle sizes. In some examples, the highest geohash level of the geohash levels may encompass countries or continents.

Table 1 provides one example set of areas for geohash and search shingles areas at various levels:

TABLE 1

| Geohash Level | Height (km) | Width (km) | Shingle Height (km) | Shingle Width (km) |
| --- | --- | --- | --- | --- |
| 1 | 0.611 | 0.483 | 1.222 | 0.966 |
| 2 | 1.22 | 0.967 | 2.44 | 1.934 |
| 3 | 2.45 | 1.93 | 4.9 | 3.86 |
| 4 | 4.89 | 3.87 | 9.78 | 7.74 |
| 5 | 9.78 | 7.74 | 19.56 | 15.48 |
| 6 | 19.57 | 15.5 | 39.14 | 31 |
| 7 | 39.14 | 31 | 78.28 | 62 |
| 8 | 78.27 | 62.29 | 156.54 | 124.58 |
| ... | | | | |
| 14 | 5009 | 5009 | 10018 | 10018 |

The various geohash levels and search shingles may permit location searches to quickly identify related geohash levels and relevant search results as further discussed below.

In addition to organizing locations into geohashes, the geohashes may also be used to determine scoring for relevant searches. That is, the geohash associated with a user's location when a trip is requested may be used to adjust the scoring of relevant locations. For example, depending on the geohash or other aspects of the search context for the search, some locations may be more or less likely to be selected by a user as relevant to the search, which may be used to score the locations depending on the search context. The scoring function module 150 determines scoring for a search request based on the search context for a search request. To determine the scoring, the scoring function module 150 may retrieve historical trip information and search results from the trip data store 175. The trip data, such as origin and destinations, may be analyzed to determine the geohashes in which a trip originated and ended. The geohashes in which the trip originated and ended, along with any additional search context, may be used to determine a scoring for a given search request. In some examples, the geohash from which the user requests a search is used to determine or modify a scoring function for possible locations relevant to the search. This scoring function may be determined based on the historical travel from the search context, and the function may describe a likelihood of the user selecting a search result in a geohash, or a likelihood of the user traveling a given distance to a destination (e.g., the likelihood of a particular trip distance).

Figure 3:
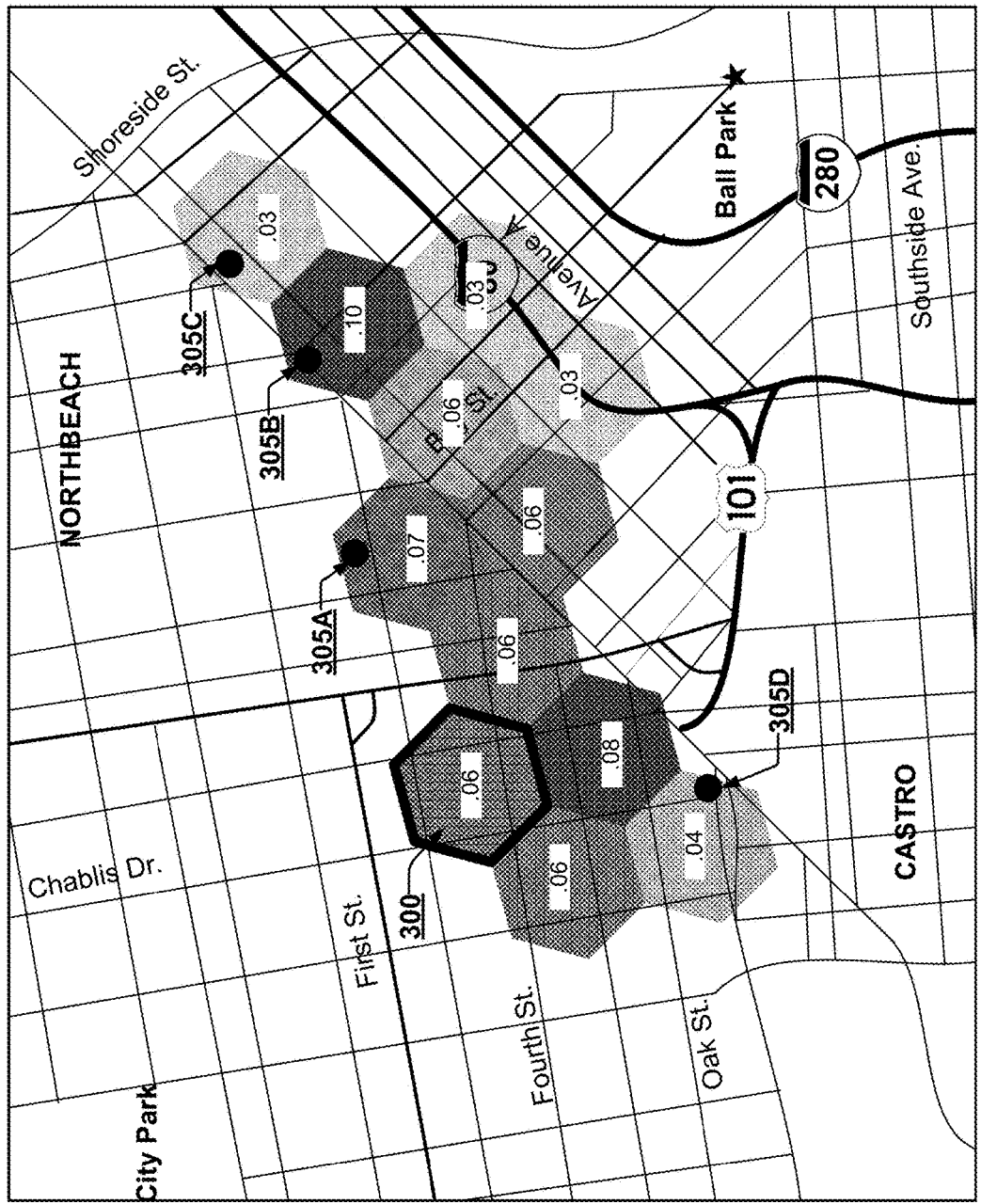
FIG. 3 shows example trip destinations for a user requesting a trip from a requesting geohash.

FIG. 3 shows example trip destinations 305A-D for a user requesting a trip (or having an origin) from a requesting geohash 300. An example set of areas of respective geohashes are shown. The geographic areas are tinted in FIG. 3 to illustrate the frequency with which trip destinations are selected to various destination geohashes from the geohash 300 associated with the search request. Stated another way, the locations may be scored differently depending on the search context in which the search request is made and the geohash in which the location is located. In the example of FIG. 3, the search scoring may be based on the search context indicating a search from geohash 300. In this example, a darker tint reflects a more likely probability of selecting a location in that geohash for a destination relative to a lighter tint. Thus, trips more frequently have a destination in the geohash containing location 305B compared to the geohash containing location 305C. The historical probability of a user selecting a search result in a given search context may be translated to a table, indicating, for example, the likelihood, for a given search context (e.g., a specific geohash in which a user submits a search request) of selecting a location in that geohash. In this example, the geohash containing location 305A has a probability of 0.07 of being selected in this search context. To score a location, such as locations 305A-D, the associated likelihood may be looked up for the related geohash and used to score the location.

Figure 4B:
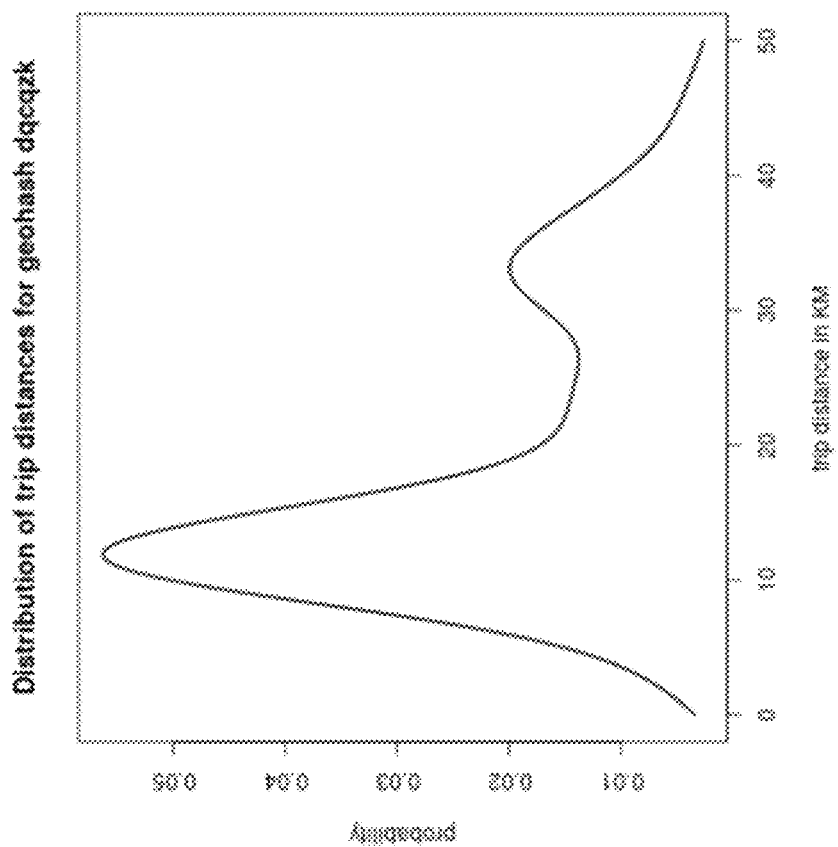
FIGS. 4A and 4B illustrate examples for converting a trip distance to a probability for scoring a search context.
Figure 4A:
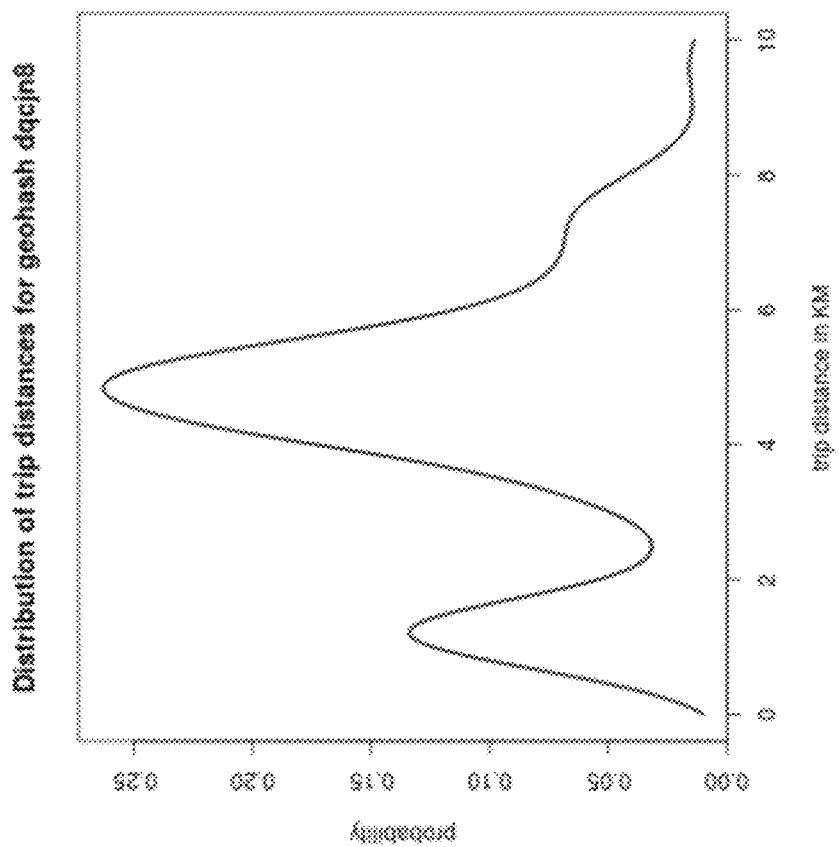

FIGS. 4A and 4B illustrate examples for converting a trip distance to a probability for scoring a search context. FIGS. 4A and 4B show a distribution of trip distances for a given geohash the defines an area containing the destination. FIG. 4A shows the distribution of trip distances for geohash dqcjn8 and 4B shows the distribution of trip distances for geohash dqcqzk. These illustrate that the shape of the distribution can vary widely across different geohashes for the selection of a destination. Though shown here in the context of selecting a destination, a similar distribution may be determined for selecting an origin, and may be selected for additional search contexts, such as the time of day. To illustrate this example, separate scoring functions (e.g., from the trip distributions) may be calculated for trips within various time ranges at the geohash, for example between 6 and 10 a.m., and another time range between 10 a.m. and 2 p.m. A distribution may be calculated by the scoring function module 150 and used as a scoring function to score possible search locations.

Returning to FIG. 1, the scoring function module 150 thus may generate scoring functions for one or more search contexts for each geocode based on prior search results selected by the user, which may be reflected by prior trips in the trip data store 175.

The search module 140 receives location search requests from the rider device 100 and determines location search results in conjunction with the location selection module 155 and the ranking module 160.

Figure 5:
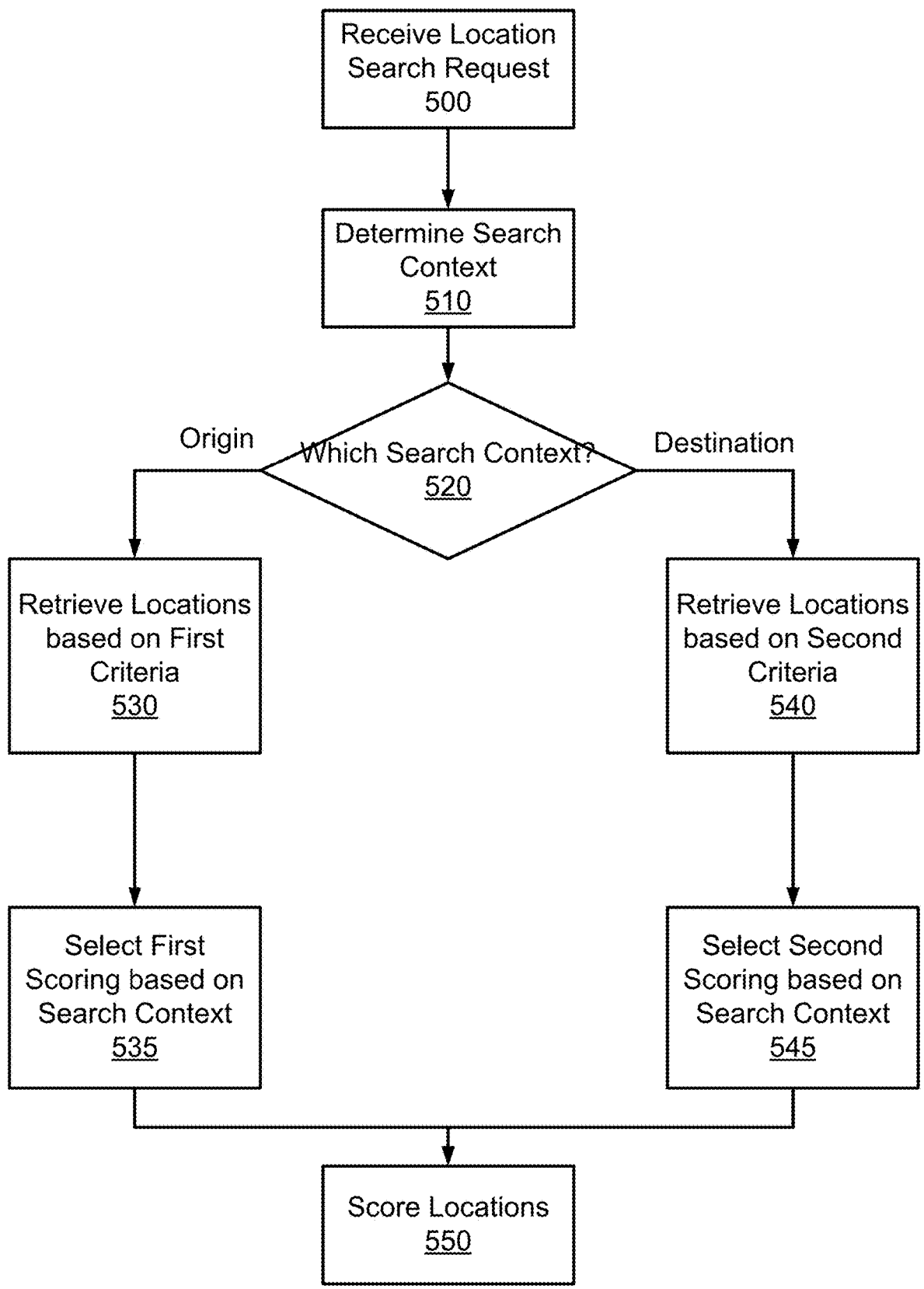
FIG. 5 illustrates one method for performing a location search according to one embodiment.

FIG. 5 illustrates one method for performing a location search according to one embodiment. Initially, the location search request is received 500 by the search module 140. From the location search request, the location search module 140 determines a search context associated with the location search request. The search context may be specified in the location search request, and as noted above may designate a location from which the search is conducted (e.g., a location of the rider device 100) as well as additional context for the search, such as whether the search is for an origin or a destination of a trip (or another type of use for the location search), a time of day, and so forth. The search context may also be determined by processing the search request or processing data external to the search request, such as by identifying the location of the rider device 100 using location data provided with the search request, or by identifying a time of day for the request, which may not be specified in the request itself.

Candidate locations are selected based on the search contexts for the location search by the location selection module 155. The candidate locations indicate the possible locations that may be selected as search results, and may be selected to initially narrow the possible locations for the search results, for example as a coarse filter. As an example embodiment shown in FIG. 5, different criteria are used to determine candidate locations depending on the context. When the search context indicates a search for an origin of a trip, the candidate locations are selected 530 based on a first criteria, and when the search context indicates a search for a destination of the trip, the candidate locations are selected 540 based on second criteria. The first and second criteria may differ in various embodiments, for example, by identifying different geohash levels for the search results. As one example, a geohash level is selected depending on the search context. A geohash at the selected geohash level may be identified that corresponds to the user location when performing the search. The candidate locations may be selected based on the selected geohash, or based on a shingle associated with the geohash. All locations for a geohash or search shingle may be identified as candidate locations, or the locations may be compared to the search query and included when there is at least a partial match between fields of the location and the search query.

Next, depending on the search context, a first scoring 535 or a second scoring 545 is selected by the ranking module 160 to score and rank the candidate locations. The candidate locations may initially be evaluated by an extent of a match between the search query and the fields of the location. The candidate locations may also be evaluated based on the geographical location and its relationship to the search context. For example, depending on the search context, the scoring may predict a relatively high or relatively low likelihood that a user will select the location based on previously-selected locations. This scoring may be based on identifying the geohash of a location and identifying the probability of the user's geohash selecting the location geohash as shown in FIG. 3, or may determine a distance from the location to the user geohash as shown in FIGS. 4A and 4B. After selecting the scoring, the retrieved candidate locations are scored 550 and can be ranked according to the score for presentation to the user.

Figure 6:
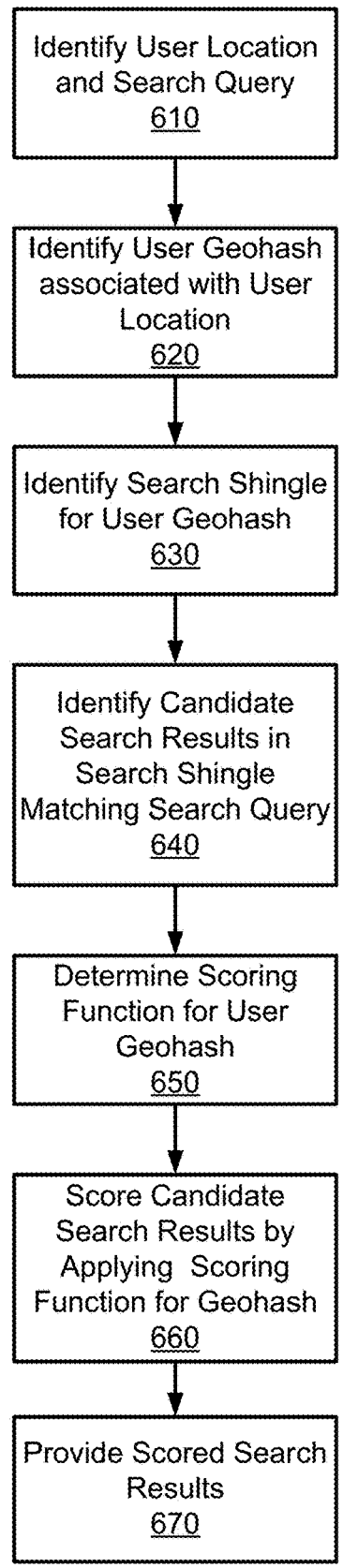
FIG. 6 illustrates another method for selecting location search results.

FIG. 6 illustrates another method for selecting location search results. The method of FIG. 6 may be performed by the travel coordination system 130, and provides one method for selecting candidate locations and selecting scoring for the candidate locations as discussed by FIG. 5. This method may be performed using one set of geohashes, such as for one geohash level. Initially, a user location and a search query are identified 610 by the travel coordination system 130, such as from a received location search request. From the user location, a user geohash is identified 620 for the user by identifying the geohash in which the user is located. For example, the user location may be compared to the geographical area associated with the geohashes to identify which geohash matches the user's location. After identifying the user geohash, the search shingle associated with the user geohash is identified 630 and candidate search results are identified for search by including locations associated with that search shingle. All locations of the search shingle may be considered a candidate, or the locations may be filtered, for example by only including locations that at least partially match 640 the search query in one or more fields of the location.

Next, the search context may be used to determine (or modify) 650 a scoring function for the candidate search results. The scoring function may be based on the search context, such as the geohash, of the search request, and may modify the way in which the candidate search results are scored. As discussed above, the scoring function may include, for the search context, probabilities of a user traveling a given distance or to a given geohash. By determining the distance of geohash of a candidate location, the probability for the search context can be applied to score the candidate location. The scores determined based on the search context may also be affected by other scores, for example by other scoring methods, such as scoring based on a comparison of the search query with the fields of the candidate locations. After scoring, the search results may be provided 670 to the user device 100 for selection of a location by the user.

Figure 7:
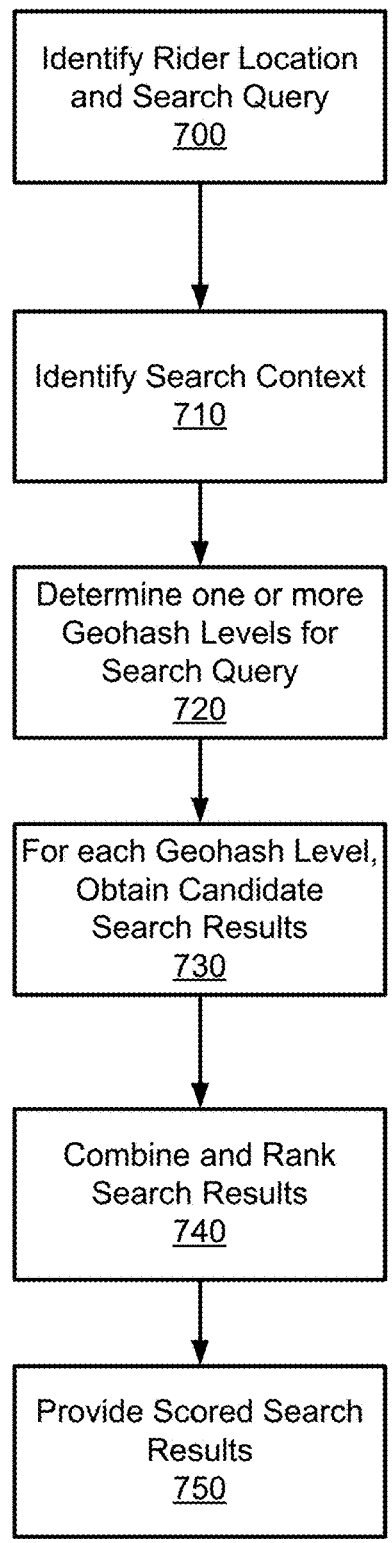
FIG. 7 illustrates a method for performing location search according to one embodiment.

FIG. 7 illustrates a method for performing location search according to one embodiment. In this example, one or more geohash levels are selected for the location search based on the search context. For example, a search context for a pickup may select a geocode level of 0, 2, and 5, while a search context for a destination may select a geocode level of 4, 8, and 12. Each level represents a different geocode size for the levels, and thus each selected geocode level may indicate a different distance for the search.

Initially, the search request is received and the rider location and search query are identified 700 and the search context is identified 710. Based on the search context, one or more geohash levels are determined 720 for the search query. The geohash levels may be determined using the search context. The geohash levels determined for a search query may be selected by an operator of the travel coordination system 130, or may be automatically determined. To automatically determine one or more geohash levels, the selection may be based on the probability that a user selects a location within a search shingle associated with the user geohash of a given geohash level. To determine this percentage, historical search requests are identified and a historical geohash for the search is identified for the search at the searching location for each level being evaluated to identify the search results for the search shingle of that historical geohash. These may be analyzed to determine the likelihood the user's selected search result occurs at a given level. For example, when a user searches for a destination, the user may select a location within a search shingle at geohash level 0 25% of the time, a geohash level 3 40% of the time, geohash level 7 80% of the time, and so forth. In contrast, when a user searches for an origin, a lower geohash level (e.g., one with a smaller area) may have a higher percentage of selections; for example, for an origin search, the search shingle for geohash level 0 may be selected 75% of searches. The one or more geohash levels may thus be selected based on the probabilities (e.g., percentage) of historical users selecting a location within that level's search shingle. In this example, the one or more geohash levels may be selected to identify a geohash level having 75%, 90%, and 100% of the selection percentage.

For each of the determined geohash levels, the candidate search results are obtained 730, for example using the method shown in FIG. 6, and may be scored, combined, and ranked 740. In one example, candidate search results are evaluated for lower geohash levels before retrieving and scoring candidate search results at higher geohash levels. To evaluate the candidates, the candidate search results are scored, which may include scoring the candidate search results based on a match to the search query. The scores may be compared to a threshold, and when the scores are below a threshold then candidate search results from the higher geohash level are retrieved and evaluated. In other examples, in addition to or as an alternative, the ranked candidate search results are sent to the user device for the user to select a result, and additional geohash levels are evaluated afterwards, such that the higher geohash levels can supplement the results sent to the searching user. Since the lower geohash level typically includes fewer candidate search results and is more likely to include the client's desired search result, this evaluation permits results from the lower geohash level to more quickly be sent to the user as higher geohash levels are evaluated. As another option, the higher geohash level when a searching user has not selected a result within a threshold period of time after sending search results to the user.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a location search request from a client device specifying a search query;
identifying, for a search context and at each search level, a percentage of locations historically selected by users within a historical geohash corresponding to a historical request location at the geohash level;
selecting a geohash level from a plurality of hierarchical geohash levels, the selection being based on the percentage for that geohash level and the search context describing one or more parameters of the location search request, each level of the plurality of hierarchical geohash levels being associated with a different area size and a set of geohashes, each geohash being associated with geographic locations within a geographic area having the area size of the geohash level, the geographic locations indexed with respect to indices at multiple geohash levels;
identifying a set of candidate locations for the search query based on a first geohash for a location of the client device at the selected geohash level, the set of candidate locations determined from an index of the selected geohash level and the identified percentage of locations; and
providing the set of candidate locations to the client device.

2. The method of claim 1, wherein a first geohash level associated with a first area size is selected when the search context indicates the location search request is for an origin of a trip, and a second geohash level associated with a second area size is selected when the search context indicates the location search request is for a destination of a trip, wherein the first area size is smaller than the second area size.

3. The method of claim 1, wherein the geohash level is selected that has at least 90% of locations historically selected by users.

4. The method of claim 1, wherein each geohash is associated with a search shingle identifying locations within the geohash and additional locations within a threshold distance of the geohash; and wherein the set of candidate locations are identified from the search shingle associated with the first geohash.

5. The method of claim 4, wherein the threshold distance is a percentage of the area size of the geohash.

6. The method of claim 5, wherein the percentage is 50%.

7. A method comprising:
receiving a location search request from a client device specifying a search query;
identifying a search context for the client device describing one or more parameters of the location search request;
identifying a user geohash corresponding to a location of the client device from a set of geohashes, each geohash being associated with geographic locations within a geographic area;
identifying a set of candidate locations for the search query;
determining a scoring function that assesses the probability of the user selecting a candidate location based at least in part on the distance of the user geohash to the candidate location, wherein the scoring function is based on a distribution of trip distances, the distribution selected based on the search context at the user geohash;
scoring each candidate location from the set of candidate locations using the scoring function; and
providing the set of candidate locations to the client device.

8. The method of claim 7, wherein the scoring function scores a candidate location based on a geohash associated with the candidate location.

9. The method of claim 8, wherein the scoring function scores the probability of a user selecting a location in a destination geohash from the user geohash, wherein the destination geohash is the geohash associated with the set of candidate locations.

10. The method of claim 7, wherein each geohash of the set of geohashes is associated with a scoring function.

11. The method of claim 7, wherein:
each geohash of the plurality of geohashes is associated with a plurality of scoring functions, each associated with a search context; and
the scoring function is selected from among the plurality of scoring functions for the user geohash by matching the search context for the client device with a search context of the plurality of scoring functions.

12. The method of claim 7, wherein one of the search context parameters specifies whether the location search request is for an origin or a destination of a trip request.

13. The method of claim 12, wherein one of the search context parameters specifies a time of day for the search.

14. The method of claim 7, wherein the scoring function specifies a set of weights for scoring a location.

15. The method of claim 7, wherein distribution of trip distance is associated with a destination geohash of the candidate location, wherein the destination geohash is the geohash associated with the set of candidate locations.

* * * * *